2,867,728
LOGGING APPARATUS
Herbert C. Pollock, Schenectady, N. Y., assignor to General Electric Company, a corporation of New York
Application October 28, 1954, Serial No. 465,331
8 Claims. (Cl. 250—83.3)

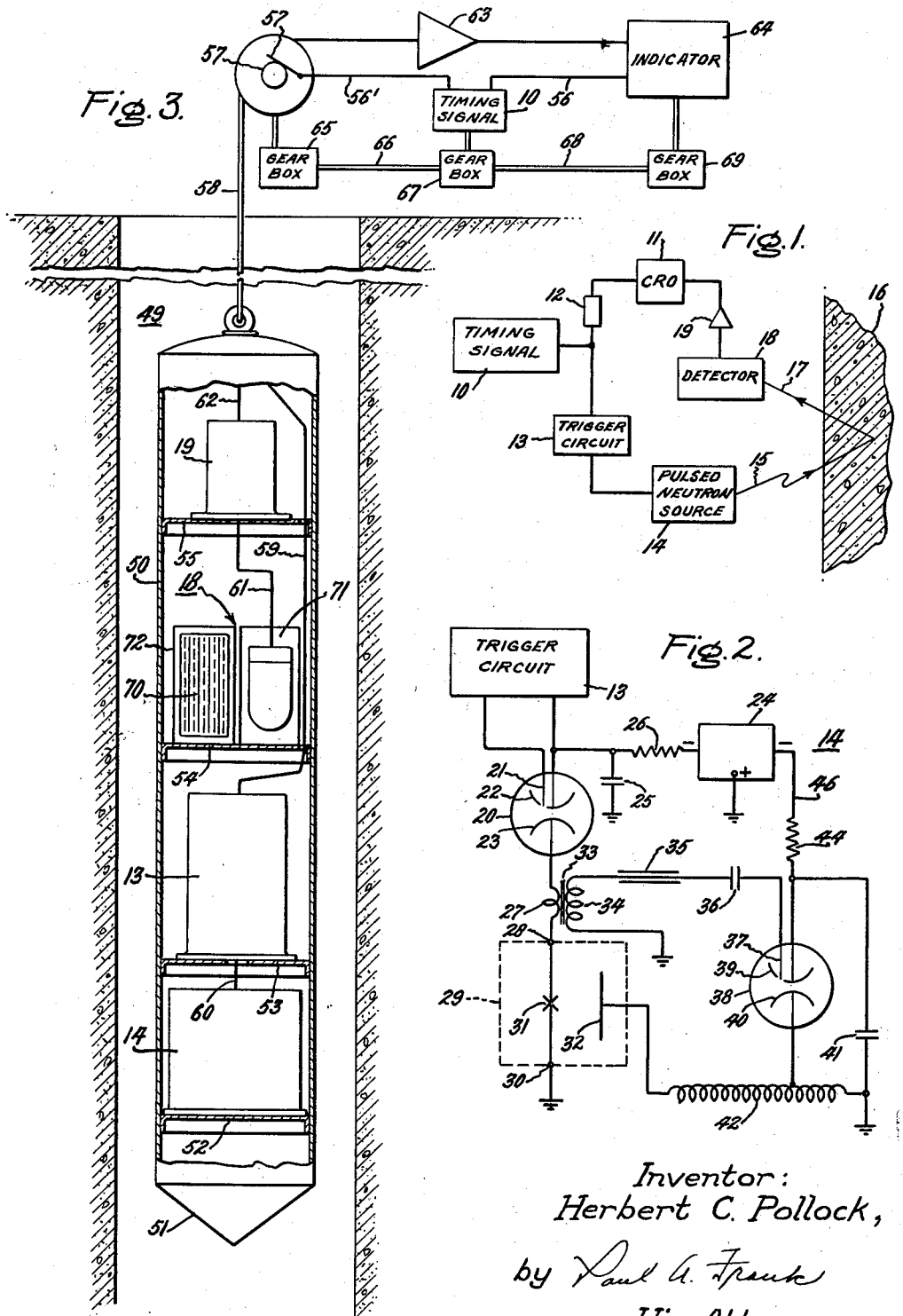
Jan. 6, 1959     H. C. POLLOCK     2,867,728
LOGGING APPARATUS
Filed Oct. 28, 1954
Inventor:
Herbert C. Pollock,
by Paul A. Frank
His Attorney.

This invention relates to an apparatus and method for determining the characteristics of materials by irradiating the materials with pulses of neutrons and detecting the reflected and induced products of this irradiation to obtain an indication of the characteristics of the materials. While this invention has a wide variety of applications and uses such as coal exploration and general geological exploration, it is particularly adapted for logging the characteristics of the strata in an oil well bore hole and will be described in that connection.

In recent years, neutron logging has enjoyed increasing popularity as a technique applicable to subsurface exploration and particularly to the study of oil bearing strata. A familiar form of neutron log involves the use of the fast neutrons from a radioactive source, such as radium-beryllium capsule together with a suitable gamma ray detector. Logging techniques consist essentially of lowering a neutron source into an oil well and irradiating the various strata. A detector associated with the source measures the gamma ray intensity, resulting from the neutron irradiation, as a function of the depth of the source and detector in the well bore hole. It is found that in many cases there is an important correlation between the lithological characteristics of the strata and the detected gamma ray record.

Methods, such as that described in the preceding paragraph, and others using a continually radiating radioactive source have certain inherent limitations. The gamma ray background of the decomposition products of a radium-beryllium source are often troublesome, particularly as this gamma-ray background travels directly to the detector and also is scattered by the walls of a well in a way which is dependent upon the size of the boring, the thickness of the well casing, the density of neighboring rocks and other factors. These factors vary in a way which often obscures the gamma ray variations produced by the neutron reactions in the formations which are intended to be studied. Methods have been proposed for limiting the effect of background radiation by providing coincidence circuits and the like so that the effects of background irradiation are effectively limited; however, such methods slow the process of obtaining a log of the neutron induced reactions and are not always reliable.

According to this invention the above-mentioned limitations are overcome by providing timed pulses of neutrons whereby a time dependent indication of the reflected and neutron reaction induced products of the neutron pulses only is obtained and from which the lithological characteristics of the strata along the well bore hole can be determined.

It is therefore an object of this invention to provide an improved method and apparatus for determining the characteristics of materials.

A further object of this invention is to provide an apparatus including a pulsed neutron source for obtaining a time dependent indication of the characteristics of material irradiated by neutrons from the pulse source.

It is also an object of this invention to provide an improved method and apparatus for determining the lithological characteristics of a well bore hole.

Another object of this invention is to provide an improved method and apparatus for obtaining a time dependent indication of the lithological characteristics of a well bore hole.

According to an embodiment of this invention a pulsed neutron source irradiates a member composed of at least one material. A detector of the neutrons reflected by the material and the induced products of the irradiation is coupled to an indicator. The indicator is fed by a timing signal which also controls the pulse neutron source so that a time dependent indication of the characteristics of the irradiated material is obtained.

Other objects, features and many of the attendant advantages of this invention will be appreciated more readily when considered in connection with the accompanying drawings wherein like parts in each of the several figures are identified by the same reference character and wherein: Figure 1 is a block diagram of a system in accordance with this invention; Figure 2 illustrates a circuit for controlling a pulsed neutron source of a type which is adapted for use with this invention; and Figure 3 illustrates a portion of a complete well bore hole logging apparatus incorporating this invention.

In order to obtain a complete understanding of the applications of this invention to the determination of characteristics of materials irradiated with neutrons and, in particular, the application of this invention to the determination of the lithological characteristics of the strata along well bore hole, it is considered desirable to discuss briefly the types of logs which may be obtained as a result of neutron irradiation.

Irradiation of a piece of material or strata along a well bore hole by a neutron can result in the reflection of the neutron, a reduction in the speed of the neutron as a result of moderation effected by hydrogenous materials, such as oil or coal, so that a fast neutron results in the return of a slow neutron, or a nuclear transformation within the material or strata and a resulting emanation of neutrons or gamma rays.

Many measurements can be made of these radiations. These measurements can be broadly classified in three categories that are respectively designated as measurements of gamma radiation, measurements of slow neutrons and measurements of fast neutrons. Measurements of the first category, when correlated with depth, provide a log commonly designated as a neutron-gamma ray log; measurements of the second category, when correlated with depth, provide a log commonly designated as a neutron-slow neutron log; and measurements of the third category, when correlated with depth, provide a log that is designated as a neutron-fast neutron log. It is apparent that by utilizing a pulsed neutron source in accordance with the method and apparatus of this invention, a time dependent indication of the characteristics of the adjoining material or strata is obtained.

Figure 1 illustrates a system incorporating this invention which comprises a timing signal source 10, the output signal of which is supplied to a cathode ray oscilloscope 11 through an attenuator 12 and also to trigger circuit 13. The output of trigger circuit 13 controls the energization of pulse neutron source 14. The output of neutron source 14 is indicated generally by line 15. The reflected and neutron reaction induced output from member 16, the characteristics of which are to be ascertained, is indicated generally by line 17. Output 17 is detected by detector 18 which feeds preamplifier 19. The output of amplifier 19 is coupled to the plates of cathode ray oscilloscope 11.

The operation of the system illustrated in Figure 1 is essentially as follows: A pulse from timing signal source 10 results in an initial indication at the beginning of the sweep on cathode ray oscilloscope 11 and alternatively may also initiate the sweep across the oscilloscope tube. The timing signal pulse also causes trigger circuit 13 to produce a triggering pulse to cause neutron source 14 to emit a pulse of neutrons which irradiate member or material 16. The emitted neutrons may have energies in portions of or all of the range from approximately 14 million electron volts to considerably less than 1 million electron volts.

The output of detector 18 is amplified by preamplifier 19 and the resulting signals from detector 18 are displayed along the horizontal sweep axis of cathode ray oscilloscope 11 as one or more pulses or pips. The amplitude of the pulses is indicative of the type of radiation or particle detected by detector 18 and the linear spacing along the horizontal axis is indicative of the time the radiation or particle is detected with respect to the time of initiation of the neutron pulse. The attenuator 12 is provided with a conventional delay line which introduces sufficient delay in the transmission of the timing pulse to the oscilloscope 11 so that the oscilloscope indication corresponds with the emission of neutrons from source 14.

Therefore, it is apparent that the above-described method and apparatus provides an indication of the reflected and induced products of said pulsed neutron irradiation and thereby a time dependent indication of the characteristics of the irradiated material.

Figure 2 illustrates an example of a pulsed neutron source which may be utilized in the practice of this invention. The system includes trigger circuit 13 which may, for example, consist of a gas filled tetrode fired by a voltage pulse from a timing signal source to discharge a capacitor through a pulse transformer. Spark gap switch 20, in which an arc discharge may be initiated by starting electrode 21, includes electrodes 22 and 23. High voltage source 24 provides charging current for discharge capacitor 25 through current control resistor 26. Electrode 22 is connected to discharge capacitor 25 and the other electrode 23 of arc discharge switch 20 is connected through current transformer 27 to terminal 28 of neutron source 29. Terminal 30 of neutron source 29 is connected to ground.

The neutron source 29 may consist, for example, of a source of deutrons generally indicated at 31 and a beryllium or alternatively lithium or titanium composition target 32 which is adapted to be bombarded by deutrons to cause the release of neutrons in a manner understood by those skilled in the art.

Transformer 27 has a ferromagnetic core 33 and the secondary 34 of this transformer is coupled to ground and to delay line 35 respectively. The output of delay line 35 is coupled to starting electrode 37. Arc discharge switch 38 is provided with discharge electrodes 39 and 40 and is connected to discharge charging capacitor 41 through a portion of autotransformer 42 and thereby initiate an accelerating pulse between ion source 31 and target 32. Capacitor 41 is charged from high voltage source 24 through current limiting resistor 44.

The apparatus illustrated in Figure 2 is operated by causing a trigger pulse to initiate an arc discharge between starting electrode 21 and discharge electrode 22 which causes switch 20 to fire and discharge capacitor 25 through transformer primary winding 27 and ion source 31. This results in the production of an ion cloud about source 31 and the initiation of a pulse in transformer secondary 34 which is delayed by delay line 35 a sufficient time to permit the complete build up of the ion cloud about source 31. The pulse from delay line 35 initiates an arc discharge across switch 38 to discharge charging capacitor 41 through a portion of autotransformer coil 42 thereby resulting in a high potential pulse which accelerates the ions so that they strike target 32 to result in the emission of neutrons.

The arc discharge utilized in an embodiment of this invention has a duration in the order of a fraction of a microsecond and the resulting pulse is delayed an additional period, which may be of the order of a fraction of a microsecond, prior to initiating the accelerating pulse. An apparatus of the type illustrated in Figure 2 is susceptible to pulse time control in the order of $1/200$ of a microsecond and therefore is ideally suited for utilization in a logging apparatus in accordance with this invention.

Figure 3 illustrates an adaptation of this invention to an apparatus for obtaining a log of the lithological characteristics of an oil well bore hole 49. This apparatus consists essentialy of enclosing jacket 50 which is provided with a heavy tapered end portion 51. Mounted within jacket 50 are neutron source 14 and trigger circuit 13 which are respectively mounted on platforms 52 and 53. Detector 18 and preamplifier 19 are likewise mounted on platforms 54 and 55 respectively.

Timing signals are provided by timing signal source 10 to indicator 64 through cable 56 and to trigger circuit 13 through cable 56', appropriate connectors such as slip rings at 57, hoist and control cable 58 and conductor 59. The output of trigger circuit 13 is coupled to pulse neutron source 14 by means of cable 60. The output of detector 18 is coupled through cable 61 to preamplifier 19. Preamplifier 19 is coupled by means of cable 62 through hoist and control cable 58 to amplifier and pulse shaping network 63 and from network 63 to indicator 64.

A gear box and hoist control 65 is provided to raise and lower the complete logging unit contained within jacket 50. The output of gear box and hoist control 65 is mechanically coupled through link 66 to gear box 67 and through mechanical link 68 to gear box 69. The output of gear boxes 67 and/or 69 may be mechanically coupled to the timing circuit and indicator, if desired, in order to obtain correspondence between timing pulses from timing circuit 10 and the position of the logging apparatus in the well bore. By coupling gear box 69 to indicator 64 it is possible to obtain characteristic indications corresponding to the position of the logging apparatus within the well bore.

The apparatus illustrated in Figure 3 is operated by slowly lowering the jacket 50 containing the logging apparatus through the bore hole 49. Pulses of neutrons, which are controlled by timing circuit 10, periodically irradiate the strata pierced by the well bore hole and the reflected and neutron reaction products of the neutron irradiation are detected by detector 18, amplified by preamplifier 19, further processed by amplifier and pulse shaping network 63, and then presented on indicator 64.

Indicator 64 may, for example, consist of a recording oscillograph such that a time dependent log is obtained as a function of the position of the detector in the well bore. The indicator may produce a single indication as a function of depth in the bore, such as a neutron-fast neutron log, or may produce a plurality of indications which are simultaneously recorded as a function of the depth of the detector in the bore.

The detector 18 may consist, for example, of a conventional boron trifluoride counter which detects reflected neutrons or neutrons resulting from neutron reactions within the material or strata being irradiated, however, a scintillation detector in combination with a photomultiplier is particularly suited if it is desired to obtain a simultaneous log of fast neutrons, slow neutrons and gamma rays and by way of example detector 18 is described as being of this type.

Detector 18 consists of an anthracene or stilbene crystal 70 and a photomultiplier 71. It is well known that an anthracene crystal is adapted to convert incoming radiation such as gamma rays, neutrons, alpha particles and the like into impulses of light. These impulses of light subsequently impinge upon the photomultiplier 71 and the output of the photomultiplier is then amplified in the linear preamplifier 19.

All of the surface of the anthracene crystal 70, except the interface between the crystal and the photomultiplier, is covered with a thin layer 72 of boron. The gamma rays and fast neutrons easily penetrate the boron layer 32 and interact with the anthracene crystal to provide suitable light impulses which subsequently energize the photomultiplier 71 and causes electrical impulses to appear in the output of preamplifier 19. The slow neutrons are, however, absorbed by the boron in the layer 72, which emits upon each neutron absorption an alpha particle of energy in the order of 2.5 million electron volts. This alpha particle subsequently interacts with the anthracene crystal providing a suitable light impulse which subsequently energizes the photomultiplier 71 and causes electrical impulses to appear in the output of the preamplifier 19. The electrical impulses from the photomultiplier have different characteristics for different particles which strike the detector. These pulses are discriminated by means of well known pulse discriminating circuits so that a simultaneous log, as a function of depth in the well bore hole, of fast neutrons, slow neutrons and gamma radiation is obtained in the form of a series of three traces on a conventional three element oscillograph.

Alternatively, separate scintillation detectors, in combination with a photomultiplier for each of the irradiation products to be detected, can be utilized. The respective outputs of the photomultipliers are supplied to the respective elements of a multi-element recording oscillograph or to separate oscilloscopes.

For example, fast neutrons can be detected at pulse speeds of the order of 0.1 microsecond with a detector consisting of zinc sulphide grains molded into a compound, such as Lucite. A detector of this type is completely described in The Review of Scientific Instruments, vol. 23, No. 6, pp. 264–267 inclusive. A detector of slow neutrons, having a response time in the order of 0.4 microsecond, may, for example, consist of a compound such as methyl borate dissolved in terphenyl in conjunction with a photomultiplier as described in Physical Review, vol. 85, page 926 (1952) and elsewhere. Gamma radiation can be selectively detected by utilization of material such as the well known sodium iodide crystal in conjunction with a photomultiplier.

It is apparent that an oscilloscope may be used to obtain time dependent information as well as a multiple element recording oscillograph and it is contemplated that any of the well known forms of recording apparatus can be used in the practice of this invention. The detector may be further provided with temperature compensating means and the periodicity and the duration of the neutron pulses can be varied to suit the particular conditions obtaining and the information desired on the neutron log.

It is apparent that the apparatus and method of this invention is subject to a very wide variety of applications and modification which incorporate pulse neutron irradiation of at least one material with neutron pulses. The reflected and induced neutron reaction products of such irradiation are utilized to obtain an indication of the characteristics of the irradiated material and, if desired, a time dependent indication of the characteristics of the material which includes an indication of the density and porosity of the material is also obtainable. This invention provides a ready means of obtaining an accurate log of a neutron irradiated material or group of materials, which is free of background neutron source decay products, and therefore provides a very rapid and economical means of obtaining a comprehensive log of the characteristics of a large number of materials.

While this invention has been described with regard to certain specific embodiments it is obvious that in the light of the above teachings many modifications and variations of the invention may be suggested by those skilled in the art. Therefore, the appended claims are considered to cover all changes and modifications coming within the true spirit and scope of this invention.

What I claim as new and desire to secure by Letters Patent of the United States is:

1. In a logging apparatus, a pulsed source of neutrons including a first means to produce ions and a second means energized by said first means to accelerate said ions to produce neutrons for irradiating at least one material to be examined and means for detecting the reflected and induced products of said irradiation whereby an indication of the characteristics of the material is obtained.

2. In a logging apparatus, a pulsed source of neutrons including a first means to produce ions and a second means energized by said first means to accelerate said ions to produce neutrons for irradiating at least one material to be examined and a detector adapted to be placed in proximity to said material, a signal source coupled to said neutron source to control neutron emission, and an indicator coupled to said detector whereby an indication of the characteristics of said material is obtained.

3. In a logging apparatus, a pulsed source of neutrons for irradiating at least one material to be examined and a detector adapted to be placed in proximity to said material, an indicator coupled to said detector, a signal source coupled to said neutron source and to said detector whereby a time dependent indication of the characteristics of said material is obtained.

4. In a logging apparatus a pulsed source of neutrons for irradiating at least one material to be examined and a detector adapted to be placed in proximity to said material, an indicator coupled to said detector, a timed signal source coupled to said neutron source and to said indicator whereby a time dependent indication of the characteristics of said material is obtained.

5. In a logging apparatus, a pulsed source of neutrons for irradiating at least one material to be examined, and a detector of the reflected and induced products of said neutron irradiation, adapted to be placed in proximity to said material, an indicator coupled to said detector, and a timed signal source coupled to said neutron source and to said indicator to control the time of neutron emission whereby a time dependent indication of the characteristics of said material is obtained.

6. A logging apparatus comprising a pulsed neutron source including a first means to produce ions and a second means energized by said first means to accelerate said ions to produce neutrons and a detector adapted to be lowered into a well to determine the characteristics of the strata pierced by the well, means for correlating the output of the neutron source and the energy received by the detector whereby an indication of the characteristics of said strata is obtained.

7. A logging apparatus comprising a pulsed neutron source including a first means to produce ions and a second means energized by said first means to accelerate said ions to produce neutrons and a detector adapted to be lowered into a well to determine the characteristics of the strata pierced by the well, means for correlating the output of the neutron source and the energy received by the detector with the depth of the detector in the well whereby a time dependent indication of the characteristics of said strata along said well is obtained.

8. A logging apparatus comprising a pulsed neutron source and a detector adapted to be lowered into a well to determine the characteristics of strata pierced by the well, means for lowering the neutron source and detector into said well, a timed signal source coupled to said neutron source and to an indicator of the reflected and induced products of the neutron irradiation from the neutron source so that the energy received by the detector and the pulse timing of the neutron source is correlated with the depth of the detector in the well to obtain a time dependent indication of the characteristics of said strata.

References Cited in the file of this patent

UNITED STATES PATENTS

| Number | Name | Date |
|---|---|---|
| 2,504,888 | Siegert et al. | Apr. 18, 1950 |
| 2,546,734 | Farber | Mar. 27, 1951 |
| 2,648,012 | Scherbatskoy | Aug. 4, 1953 |
| 2,689,918 | Youmans | Sept. 21, 1954 |

Disclaimer 2,867,728.—*Herbert C. Pollock*, Schenectady, N.Y. LOGGING APPARATUS. Patent dated Jan. 6, 1959. Disclaimer filed Mar. 8, 1963, by the assignee, *General Electric Company*.

Hereby enters this disclaimer to claims 1 through 8, inclusive, of said patent.

[*Official Gazette May 21, 1963.*]